July 10, 1945.  C. O. MARSHALL  2,380,364
FOOD HANDLING APPARATUS
Filed March 21, 1942  4 Sheets-Sheet 4
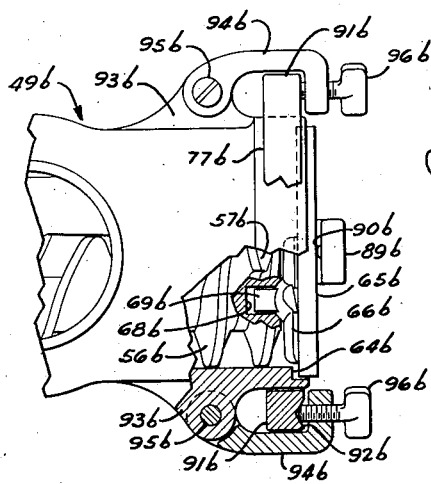
Fig. XII
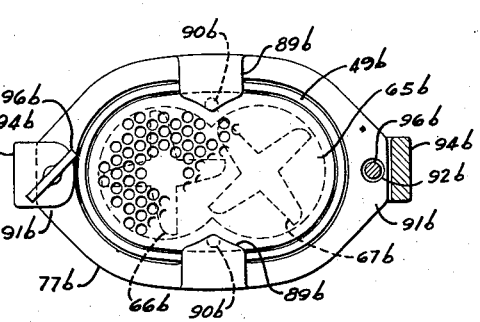
Fig. XIII
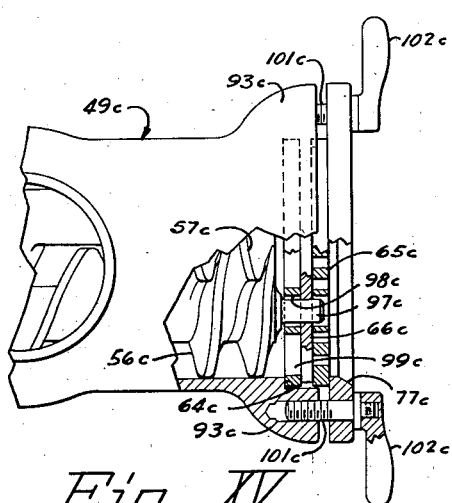
Fig. XV
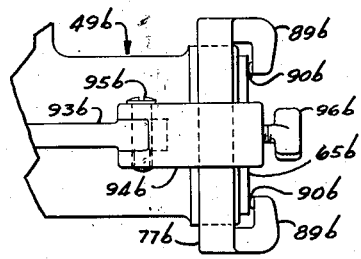
Fig. XIV
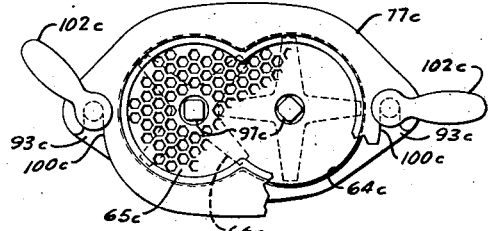
Fig. XVI
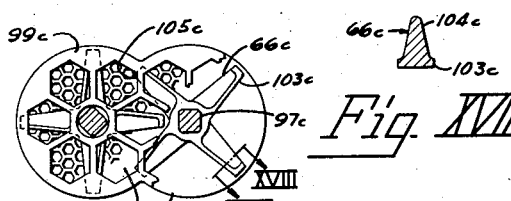
Fig. XVII  Fig. XVIII
Charles O. Marshall
INVENTOR
BY Marshall & Marshall
ATTORNEYS Patented July 10, 1945

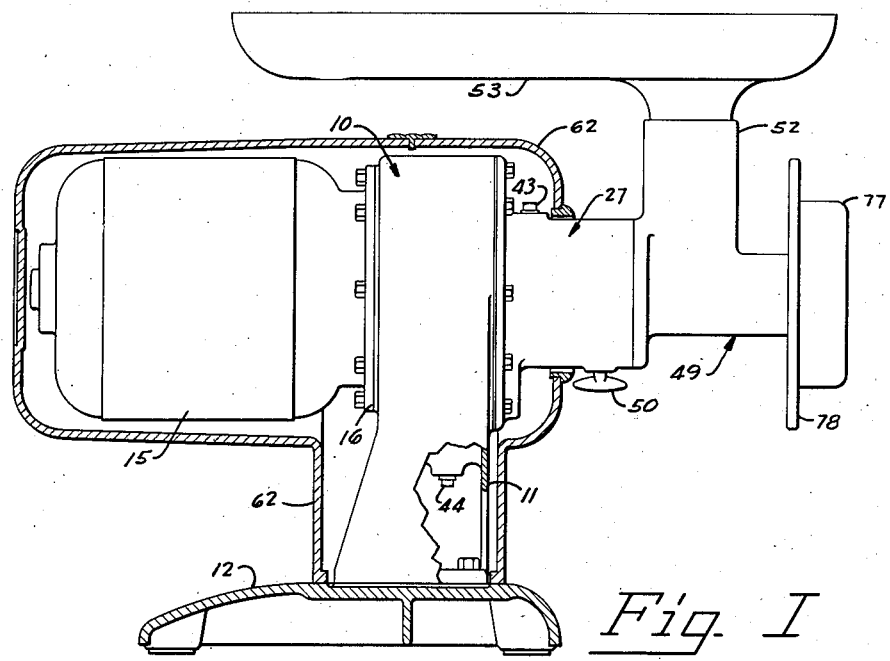
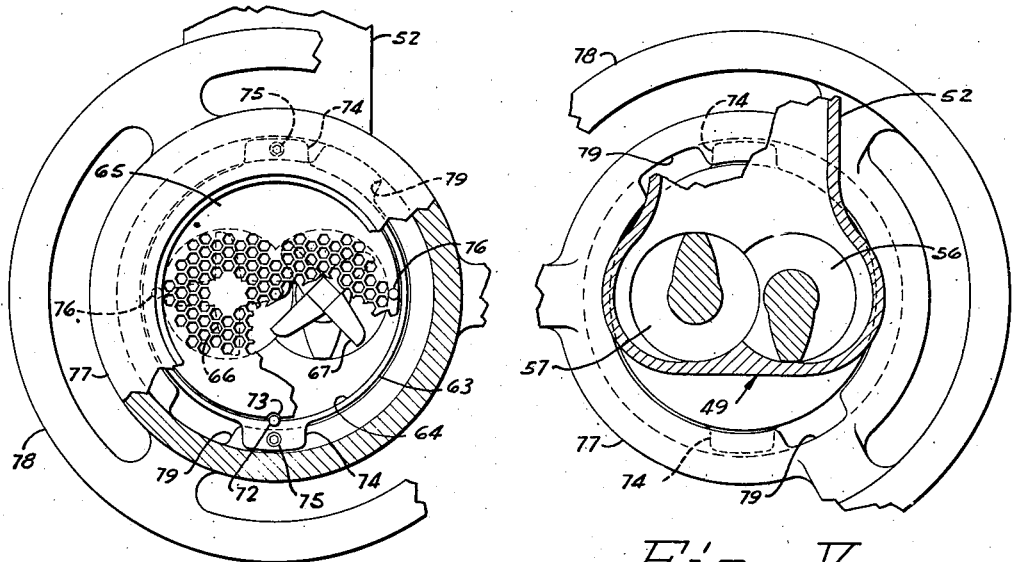

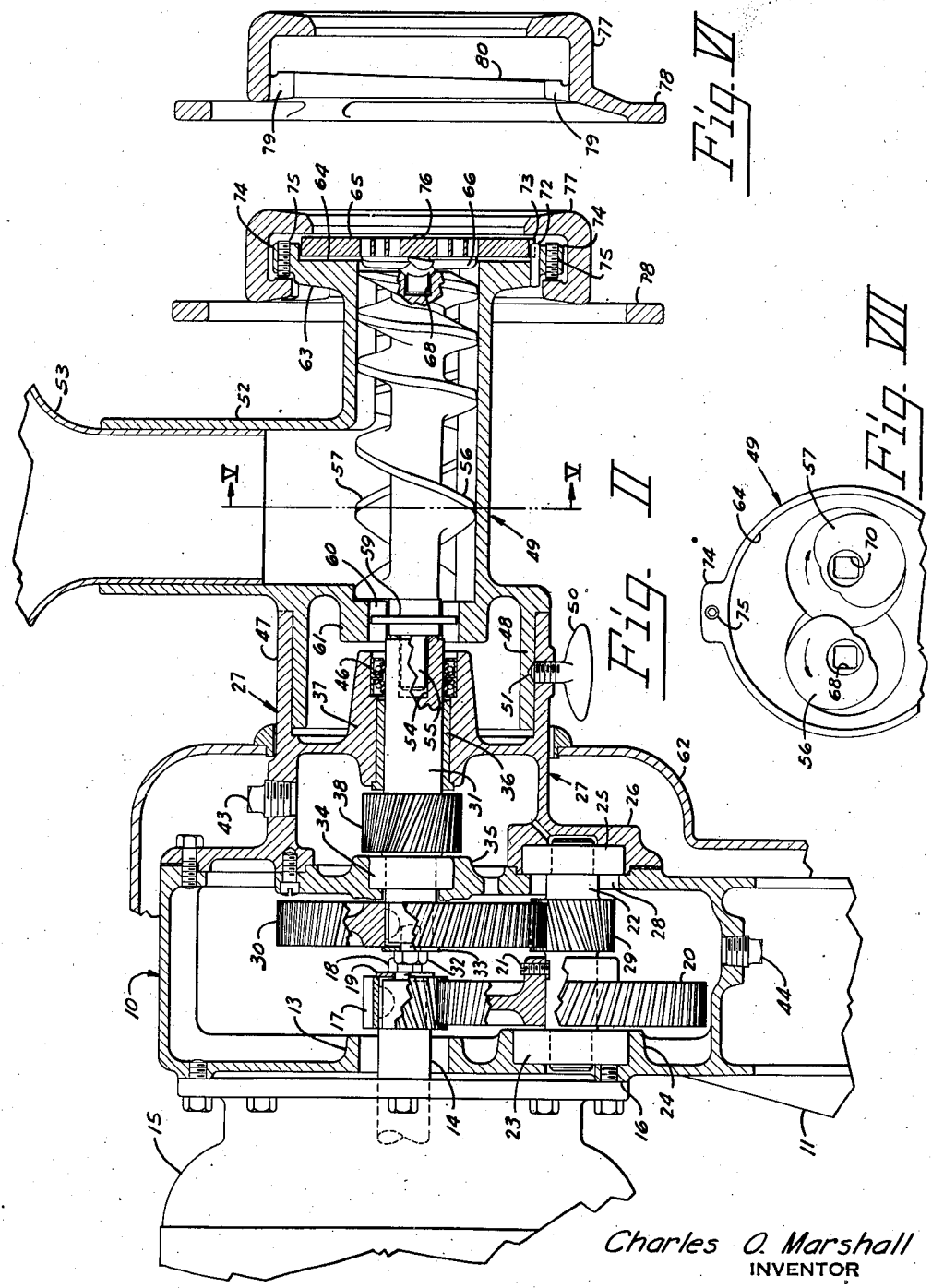

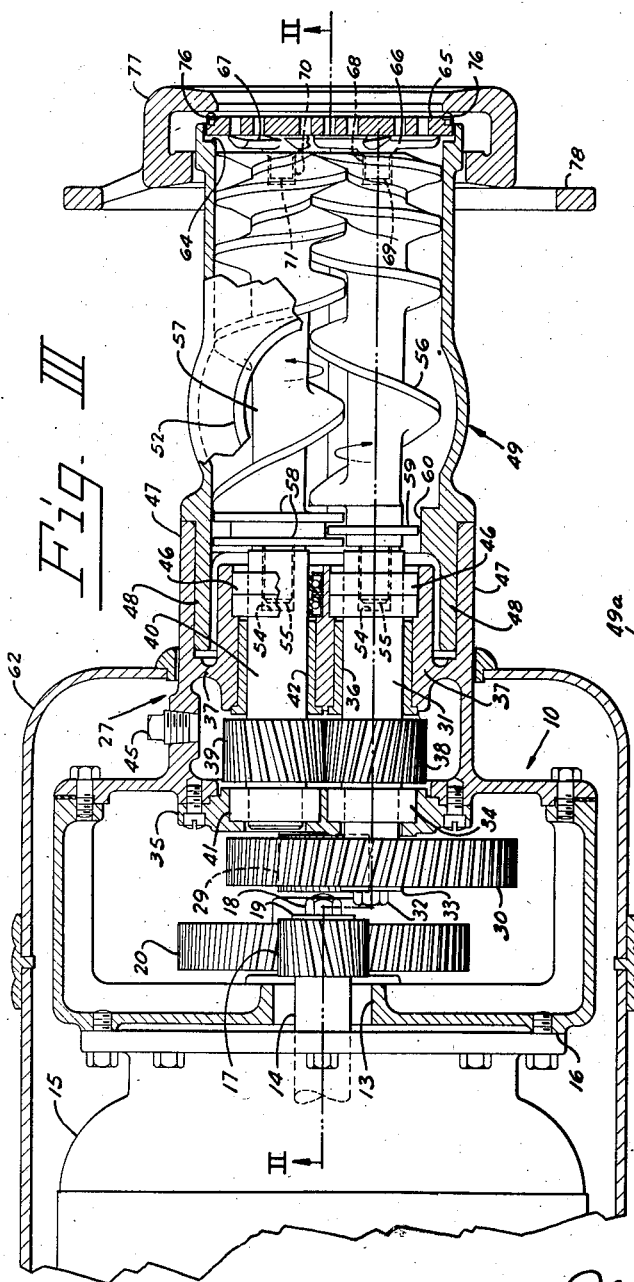

2,380,364

UNITED STATES PATENT OFFICE 2,380,364

FOOD HANDLING APPARATUS

Charles O. Marshall, Toledo, Ohio, assignor to Toledo Scale Company, Toledo, Ohio, a corporation of New Jersey Application March 21, 1942, Serial No. 435,602

21 Claims. (Cl. 146—183)

This invention relates to food handling apparatus, and more particularly to machines for chopping meat.

In chopping meat it is desirable that the meat be cut into small pieces rather than shredded or torn. When the fibers of the meat are shredded or torn the meat juices are forced out of the meat and consequently the flavor is partially spoiled and some of the nutritional values in the meat are lost. This is caused by the action of the feeding means with which standard meat choppers are equipped. This feeding means usually consists of a single feeding worm which extends through a cylindrical hollow chamber having fluted walls. The meat is inserted into one end of the chamber and rotation of the feeding worm or screw on its longitudinal axis feeds it through the chamber and against a perforated plate or plates which close the other end of the chamber. The pressure exerted on the meat by the feeding worm forces it against the face of the perforated plate and causes small protuberances of meat to extend into the perforations. A rotary knife, mounted on the end of the feeding screw either inside or outside the plate, revolves cutting off the small nodules of meat. The continued feeding pressure of the worm forces additional meat against the plate and the rotating knife continues to cut off the nodules thus formed so that tendril-like portions of meat extrude through each of the perforations in the plate.

One of the major difficulties with the single worm type of feeding device is the fact that unless some means is provided to create positive friction between the walls of the chamber and the meat being fed by the worm, such meat as enters the threads of the worm will remain there and will revolve around with the worm without being fed forward to the chopping end of the chamber. In order to prevent meat from being carried around and around in the threads, the chamber is usually constructed with a fluted inner wall. The flutes may extend longitudinally of the chamber, parallelly to the axis of the worm, or they may be spiraled around the inner wall of the chamber in almost any relation to the spiral thread of the worm. They do not extend down between the threads because the diameter between the flutes, transversely across the chamber, must be kept slightly larger than the transverse diameter of the threads so that the worm will rotate in the chamber. The flutes are constructed so that their centrally extending edges, which are kept quite sharp, present obstructions to any meat which may have entered the space between the flutes, thus to prevent the meat from sliding around the cylinder and cause it to be fed forwardly by the worm.

This obstruction of rotary movement of the meat is necessary in order to cause feeding but has a detrimental effect on the quality of the chopped product since it tends to rend and tear the meat apart which causes the juices to be forced out of the fibers.

The flutes, in cooperation with the worm, create a second undesirable result. Pressure to feed the meat through the chamber often must be supplied by means of a manually operated tamper which forces the meat into the entering bores of the worm chamber. Of course when the last of the meat has entered the worm chamber it is impossible to apply external pressure and the meat is carried forward only by the action of the fluted interior walls and the feeding worm. If, for example, one pound of meat is desired to be chopped, as much as one-quarter of a pound of meat may remain in the space between the threads of the worm and in the longitudinally extending space between the flutes on the interior surface of the chamber. This meat will remain in the device until a second chopping operation is carried through at which time the meat remaining from the prior chopping operation will be forced out of the perforated plate ahead of the meat being chopped in the second operation. This residue of meat would not be important if the meat chopper were used steadily to prepare only one grade or quality of meat. However, in most butcher shops many varieties of meat are sold and it may be that a customer desiring to purchase chopped high grade meat will follow a customer who has purchased chopped dog meat. In this event, the one-quarter pound of poor grade meat, which remains behind in the convolutions of the worm and chamber, will be mixed with the high grade meat being chopped and part of the high grade meat will remain in the machine to mix with the next lot that passes through.

The unpositive feeding action of single worm convoluted chamber meat choppers has yet another disadvantage. In order to thoroughly chop the meat, it usually is fed through the machine a second time. Since, in the first chopping, the meat being fed is in relatively large lumps, the friction producing action of the flutes will cause a fair amount of pressure and a fairly positive feed. However, on the second cut the meat is already chopped into quite small particles and is in somewhat "mushy" condition. Thus the friction action of the flutes is relatively ineffectual and that meat remaining in the worm and the flutes after the last of the meat has been forced into the entering bores of the chamber by means of the tamper is not fed forward at all but remains in the machine.

It is an object of this invention to provide a machine for comminuting or chopping meat or other products which employs positive feeding means and which will feed all of such product through the feeding chamber.

It is another object of this invention to provide a chopping machine which will create its own feeding pressure in its feeding chamber and will feed the material being ground with the same positiveness whether such material is in small or large pieces or whether it is fibrous or "mushy."

It is another object of this invention to provide a machine for chopping meat or other commodity which will not rend the fibers of the meat and thus will not cause the juices to be forced out and will produce a chopped product containing the full flavor and nutritional value possessed by the commodity prior to grinding.

Still another object of this invention is to provide a meat chopping machine having a pair of oppositely rotating feeding worms operating in a chamber having smooth walls in which the positive feeding action of the worms will clean the material being ground from the chamber and completely discharge such material into, and through, the perforated discharge plates of the device.

A further object of this invention is to provide a double-worm meat-chopping machine with features to prevent the assembly of the machine with the two feeding worms in incorrect positions or to incorrectly assemble such parts as cutting knives and perforated plates.

More specific objects and advantages are apparent from the description, in which reference is had to the accompanying drawings illustrating a preferred form of device embodying the invention.

In the drawings:

Fig. I is a view in elevation of the mechanism of a chopping machine embodying the invention, the cover therefor being shown in section.

Fig. II is a fragmentary view, partly in vertical section, on a greatly enlarged scale, of the operating portions of the device shown in Fig. I, the view being taken substantially on the center line of one of the feeding worms as indicated by the line II—II of Fig. III.

Fig. III is a horizontal partly sectional view, taken substantially on the center line of the feeding worms.

Fig. IV is a fragmentary view in elevation, certain parts being broken away and certain parts being shown in section, taken from the right end of Fig. II.

Fig. V is a fragmentary vertical sectional view, taken substantially from the position indicated by the line V—V of Fig. II.

Fig. VI is a vertical sectional view of a compression ring adapted to be mounted on the extruding end of the chamber of the device and so shown in Fig. II.

Fig. VII is a fragmentary elevational view of the end of the feeding chamber as it would appear with the compression ring, perforated plate and cutting knives removed.

Fig. VIII is a fragmentary plan view of a modified perforated plate compression means, certain parts being broken away and certain parts being shown in section.

Fig. IX is a view in elevation, certain parts being broken away, taken from the right side of Fig. VIII.

Fig. X is a greatly enlarged fragmentary view, taken substantially on the line X—X of Fig. IX.

Fig. XI is a detailed fragmentary view of the knife retaining means employed in the modification of the mechanism illustrated in Fig. VIII.

Fig. XII is a plan view similar to Fig. VIII but of a second modification of the compression means.

Fig. XIII is a view similar to Fig. IX but of the modification of the device illustrated in Fig. XII.

Fig. XIV is a fragmentary view in elevation, taken from the side of that modification of the device shown in plan in Fig. XII.

Fig. XV is a view similar to Fig. XII but of a third modification of the device employing two perforated extruding plates.

Fig. XVI is a view similar to Fig. XIII but taken from the right side of Fig. XV.

Fig. XVII is a view in elevation, certain parts being broken away, taken from the inside of the housing shown in Fig. XV and showing the two perforated extruding plates.

Fig. XVIII is an enlarged sectional view, taken substantially on the line XVIII—XVIII of Fig. XVII.

These specific drawings and the specific description that follows merely disclose and illustrate the invention and are not intended to impose limitations upon the claims.

A main gear housing 10 has a downwardly extending frame member 11 which is secured on the upper surface of a flared base 12. The left end wall of the gear housing 10 has a centered bored boss 13 through which extends the end of a shaft 14 of a motor 15 which is bolted to an annular flange 16 of the housing 10. A helical pinion 17 is keyed to the end of the shaft 14 and secured thereto by means of a nut 18 threaded onto a reduced portion of the shaft 14 and a washer 19 located between the nut 18 and the pinion 17. The pinion 17 is in mesh with a helical gear 20 which is secured, by means of a set screw 21, on a jackshaft 22 journaled in a combination thrust and radial bearing 23 which is located in a boss 24 of the housing 10 and in a second combination radial and thrust bearing 25 which is located in a flange 26 of a second gear housing 27 bolted to the other wall of the housing 10. The flange 26 of the housing 27 is in line with a hole 28 in the wall of the housing 10 through which hole the jackshaft 22 extends into the bearing 25.

A second helical pinion 29 is integral with the jackshaft 22 and is in mesh with a second helical gear 30 keyed on the end of a horizontal stub shaft 31 and secured thereto by means of a screw 32 and washer 33. The stub shaft 31 (see also Fig. III) is journaled in a combination bearing 34 which is located in a web 35 of the housing 10 and a sleeve bearing 36 which is inserted in a spider 37 of the second gear housing 27.

A helical pinion 38 is formed integrally with the stub shaft 31 and is in mesh with a similar helical pinion 39 which is an integral portion of a second stub shaft 40 journaled on the same horizontal plane and parallel to the stub shaft 31 in a combination bearing 41 and sleeve bearing 42 carried by the web 35 of the housing 10 and spider 37 of the second housing 27.

An oil filling plug 43 (Fig. II) is threaded into the wall of the second housing 27, an oil drain plug 44 is located in the bottom pump of the main housing 10 and an oil level plug 45 (Fig. III) is located at the side of the second gear housing 27 to permit filling, draining and level testing of lubricating oil for the various gears, bearings and shafts located in the housings 10 and 27. Double oil seals 46 are located in the spider 37 around the ends of the stub shafts 31 and 40 opposite the bearings 34 and 41, one of their felts being turned to retain oil within the gear housings 10 and 27 and the other one of the felts being turned to prevent the ingress of any liquid into the gear housings 10 and 27 and the dilution of the oil contained therein.

The inner surface of a sleeve-like section 47 of the gear housing 27, which surrounds the end of the spider 37 through which project the stub shafts 41 and 40, is machined to receive the machined outer surface of a cylindrical section 48 of a worm chamber 49. The worm chamber 49 is secured in place with the cylindrical section 48 inside the sleeve-like section 47 by means of a thumb screw 50 threaded through the wall of the sleeve-like section 47 and engaged in a notch 51 in the outer surface of the cylindrical section 48.

The worm chamber 49 extends horizontally with two longitudinally intersecting bores having a vertical transverse cross section substantially like a figure 8 on its side (as can be seen in Fig. V). A vertically extending feeding tube 52 is a portion of the worm chamber casting and its axial line intersects a line drawn parallel to the axis of the twin bores of the chamber 49 at a point laterally equidistant from such axis. A feeding tray 53 is mounted, by means of its spout, in the feeding tube 52.

A squared socket 54 is located in the end of each of the stub shafts 31 and 40 and is adapted to receive a squared tenon 55 cut on the end of each of a pair of intermeshed feeding worms 56 and 57 respectively. The worms 56 and 57 are of opposite hands, the worm 56 having a left-hand thread and the worm 57 a right-hand thread. The threads of the two worms 56 and 57 are intermeshed and their pitch simultaneously becomes less and less going away from the ends of the worms located beneath the feeding tube 52.

The two worms 56 and 57 are prevented from relative longitudinal translation by means of a pair of flanges 58 cut in the hub of the worm 57 adjacent the tenon 55 which are located one on each side of a single flange 59 cut in the hub of the worm 56 near the squared tenon 55. These interlocking flanges 58 and 59 are necessary to prevent one of the worms from screwing the other out of the worm chamber. In addition, the outside diameter of the flanges 58 is larger than the outside diameter of the flange 59 and the inner diameters of twin intersecting bores 60 of a spider 61, forming the inner end of the bores of the worm chamber 49, correspond to the outside diameters of the flanges of the respective worm which should be located in that side of the worm chamber 49. This difference in outside diameter of the flanges and inside diameter of the bosses in which they turn prevents the insertion of the worms on the wrong side of the device for proper operation.

A case 62, which is styled to conform with the contour and design of the tray 53 and flared base 12, covers the motor and gear housings, blending with the base 12 to give the machine a pleasing appearance and make it easier to clean and polish.

The end of the worm chamber 49, which extends away from the housing 27, has a flange 63 which is transverse to the longitudinal axis of the worm chamber and the outer edge of which is circular in shape. A circular seat 64, which is at right angles to the axes of the worms 56 and 57, is machined in the end face of the circular flange 63, the maximum diameter of the seat 64 being just slightly greater than the maximum width of the 8 shaped interior of the worm chamber 49 (see Fig. III). A perforated circular plate 65 is adapted to be located in the space created by the seat 64. The outer edge of the plate 65 is circular but the perforations therein are all located in an area coextensive with the area of the end of the 8 shaped interior of the worm chamber 49.

The perforations in the plate 65 (Fig. IV) preferably have a hexagonal cross section. These perforations may, of course, be circular but the hexagonal shape is preferred because a substantially smaller amount of material is left between the holes and consequently a greater open area exists in the plate. The open area of the plate is one factor controlling the maximum output of meat from the machine and thus hexagonal perforations give a greater output than circular perforations.

Two rotary knives 66 and 67 (see also Fig. IV) are located at the ends of the feeding worms 56 and 57 respectively. A squared socket 68 (Fig. VII) is cut at the center of the web of the worm 56 and is adapted to receive a squared shank 69 (Fig. III) of the knife 66. A rectangular socket 70, having a length greater and a width smaller than one side of the squared socket 68, is adapted to receive a rectangular shank 71 of the knife 67. The two sockets 68 and 70, and the shanks 69 and 71 respectively of the knives 66 and 67 which fit therein, are different in shape in order to prevent the assembly of the wrong knife in either of the worms. Since the worms turn in opposite directions, as indicated by the arrows in Figs. III and VII, and since the knives are cut so that their leading edges scrape over the inside surface of the perforated plate 65, these knives would not operate if assembled in the wrong worms and, therefore, such incorrect assembly must be prevented.

A pin 72 (Figs. II and IV) is located in the flange 63 and extends slightly into the space formed by the seat 64. A notch 73 in the edge of the perforated plate 65, is adapted to be engaged by the pin 72 to correctly locate the plate 65 with its perforated sections in registration with the open end of the worm chamber 49.

Through each of a pair of ears 74 (Figs. II and IV), which extend radially from the flange 63, there is threaded a screw 75 which is adjustable longitudinally of the worms 56 and 57. A pair of buttons 76 (Figs. III and IV) are located near the edges of the perforated plate 65 on a horizontal line passing through its center point. A compression ring 77, having a handwheel 78 constructed integrally therewith, has two longitudinal openings 79 cut in its frame. The center opening of the ring 77 has a slightly smaller diameter than the perforated plate 65. The compression ring is formed as an annulus with a substantially U shaped cross section (Fig. VI) and the openings 79 are cut through one of the arms of the U at opposite sides of the ring 77. The surface of that half of the annular arm of the U, through which the openings 79 are cut, is slightly beveled between the openings 79 and forms cam surfaces 80 (Fig. VI).

The compression ring is placed on the end of the worm chamber by holding it in a vertical position concentrically with the flange 63 of the worm chamber and then moving it horizontally onto the end of the worm chamber, the ears 74 passing through the openings 79 until the buttons 76 are engaged by the inner surface of the compression ring adjacent the edges of the center opening. The plate is then given a sharp twist in a clockwise direction to turn it into the position shown in Fig. IV and the action of the cams 80 forces the compression ring toward the rear of the worm chamber and squeezes the perforated plate 65 against the knives 66 and 67 which are located in the sockets in the ends of the worms 56 and 57.

As the knives 66 and 67 get dull or wear into the surface of the perforated plate 65 either the knives or the plate may be ground off so that their cutting action will be restored. This, of course, results in the plate becoming gradually thinner and the knives gradually extending a lesser distance from the ends of the worms. Therefore, to compress the parts together, the ring 77 is turned further to the right and, later, the screws 75 are threaded further through the ears 74 to cause the compression ring to seat further on the flange 63.

The shoulders of the sockets 68 and 70 are spherically-shaped as are those portions of the knives 66 and 67 where the tenons 69 and 71 join the body of the knives. The tenons fit loosely into the sockets which permits a slight rocking movement of the knives to compensate for unevenness in the grinding or variations in thickness of the plate 65. Also, since the entire pressure exerted on the plate 65 by the compression ring 77 is applied to the buttons 76, the plate 65 is free to rock through a slight vertical angle on the horizontal axis formed by the buttons 76. Similarly, the compression ring 77 being clamped against the two screws 75 only, it is free to rock through a slight horizontal angle on the vertical axes formed by the screws 75. The perforated plate is thus held in a gimbal-like mounting and is slightly rockable in any direction.

In Figures VIII, IX, X and XI there is illustrated a modification of the knife assembly and compression plate retaining means. Figure VIII is a fragmentary plan view of the end of a worm chamber 49a showing the ends of two worms 56a and 57a. The worm chamber shown in this figure differs from that illustrated in Figures II and III principally in the fact that (Fig. IX) its cross section is oval at its end rather than circular (Fig. VII). A shouldered seat 64a is cut in the edge of the worm chamber 49a and adapted to receive an oval-shaped perforated plate 65a. The perforations in the plate occupy a section thereof equal in area to and in alignment with the bores of the worm chamber 49a. The perforated plate 65a is clamped in place in the seat 64a by means of two socketed screws 81a (Figs. IX and X) which are threaded into holes bored in the main casting of the worm chamber 49a. Two rotary knives 66a and 67a are engaged in sockets in the ends of the worms 56a and 57a; the knife 66a being engaged in a squared socket 68a of the worm 56a, and the knife 67a being engaged in a rectangular socket in the worm 57a.

The knife 66a (Fig. XI) has four cutting blades 82a and a bored hub 83a which is squared on its exterior surface and adapted to engage in the socket 68a. The knife 66a is held in place against the inner face of the plate 65a by means of a socket-headed bolt 84a, which extends through a squared hole 85a in the plate 65a, bored on the axis of the worm 56a, and which is threaded into the end of a stub axle 86a. The stub axle 86a has a circular flanged head and a cylindrical portion which extends through the bore in the hub 83a of the knife. An antifriction washer 87a is located between the shoulder of the hub 83a and the head of the stub axle 86a. A squared tenon 88a on the end of the stub axle 86a is engaged in the squared hole 85a in the perforated plate 65a. The knife 67a is similarly constructed and is similarly secured to the perforated plate 65a.

The knife 66a is held securely against the inner surface of the plate 65a by the tightening action of the bolt 84a and the threaded inner bore of the stub axle 86a. The knives 66a and 67a are turned by the engagement of their squared hubs in the sockets in the ends of the worms 56a and 57a and rotate on the stub axles 86a. The axles 86a are prevented from rotating by their squared tenons which are engaged in the squared holes 85a in the plate 65a. When the knives are sharpened or the plate 65a ground smooth, the space created between their surfaces is taken up by tightening the socketed bolt 84a to draw the knives up against the surface of the plate 65a. The socket 68a in the worm 56a and the similar socket in the worm 57a are deep enough to allow for a sufficient amount of longitudinal adjustment of the position of the knives to compensate for wearing and replacement.

In Figures XII, XIII and XIV there is illustrated still another modification of the knife and perforated plate mounting means. In this embodiment of the invention the end of a worm chamber 49b is oval in cross section (Fig. XIII) and has cut into its edge a seat 64b in which a perforated plate 65b is adapted to be seated. Two worms 56b and 57b are located in the interior of the worm chamber 49b and in the end of each of these worms there is located a squared (or rectangular) socket 68b which receives a squared (or rectangular) tenon 69b of a rotary knife 66b (or 67b).

The perforated plate 65b is securely clamped in place by means of an oval compression ring 77b which fits over the end of the worm chamber 49b and which has two arms 89b, one located at the top and one at the bottom, extending inwardly over the edge of the perforated plate 65b. At the end of each of the arms 89b there is located a protuberance 90b which engages the outer face of the perforated plate 65b. At each side of the compression ring 77b there is located an ear 91b which has a dimple 92b in its outer surface. The ears 91b are located on the horizontal center line of the worm chamber 49b. At each side of the worm chamber 49b, and slightly removed from its end, there is located an ear 93b. A swinging clamp 94b is pivotally mounted on each of the ears 93b by means of a screw 95b which extends through a vertical hole in the ear 93b and is threaded into the clamp 94b. The clamps 94b swing on a horizontal plane around in front of the ears 91b of the compression ring 77b and a horizontally extending thumb screw 96b is threaded through each of them, the screws being engageable in the dimples 92b.

As the knives 55b and 56b are sharpened and the inner surface of the perforated plate 65b cut away the plate must be moved further into the seat 64b to press the knives firmly against its inner surface. This is taken care of by tightening the thumb screws 96b to a greater degree. The protuberances 90b and the ends of the thumb screws 96b form a "gimbal" mounting for the perforated plate 65b which is permitted to pivot horizontally on the protuberances 90b and vertically on the ends of the set screws 96b to compensate for unevenness in the grinding thereof, the sharpening of the knives or tough portions of meat which may force their way in between the cutting edges of the knives and the perforated plate.

The modification of the invention shown in Figures XV, XVI, XVII and XVIII comprises a worm chamber 49c at the end of which there are located two horizontally extending ears 93c, one of these ears being located at each side of the worm chamber. Two worms 56c and 57c are located in the interior bore of the worm chamber 49c. At the end of each of the worms 56c or 57c there is located a squared tenon 97c which extends through an aperture 98c in a coarse perforated plate 99c having an 8 shaped periphery and seated in a seat 64c cut in the end of the worm chamber 49c. On each of the tenons 97c there is mounted a rotary knife 66c (the knives in this modification being identical). The knives 66c are held in place on the tenons 97c and against the surface of the plate 99c by a fine perforated plate 65c which is squeezed against the knives by a compression ring 77c.

The compression ring 77c (Fig. XVI) has a slot 100c at each side. The slots 100c are adapted to fit over bolts 101c which are threaded into the ears 93c of the worm housing 49c. Removable wrenches 102c are used to tighten the bolts 101c and after tightening may be removed from the heads of the bolts and replaced thereon in any one of a plurality of positions so that the wrenches will not extend in front of the perforations in the plate 65c.

The knives 66c are shown in cross section in Fig. XVIII and have a squared cutting edge 103c and a tapered following edge 104c. The knives 66c rotate between the coarse perforated plate 99c and the fine perforated plate 65c. Meat which is carried through the worm chamber by the worm is forced against the inner coarse plate 99c and portions thereof extend through the large six-sided openings 105c in this plate. These portions of meat are sheared off the main body by the cutting action of the edge 103c against the edges of the holes. These smaller sheared-off portions of meat are pushed against the inner surfaces of the fine perforated plate 65c and the nodules extending into the perforations are clipped from the meat by the shearing action of the other side of the edge 103c against the edges of the perforations in the plate 65c.

The embodiment and modifications of the invention that have been disclosed may be modified to meet various requirements.

Having described my invention, I claim:

1. In a device for chopping meat, in combination, a pair of intermeshed feeding worms, an elongated chamber in which said worms are parallelly and rotatably mounted, said chamber having two longitudinally intersecting parallel bores, a perforated plate located across one end of said two bores, said worms being adapted to feed material toward such end of said chamber, a revoluble knife drivingly mounted at the end of each of said worms and adapted to sweep over the face of said plate, means for rotating said worms, and mounting means for said plate which permit rocking movement of said plate to equalize the pressure on said knives.

2. In a device for chopping meat, in combination, an elongated chamber having two parallel longitudinally intersecting bores, a worm located in each of said bores, the threads of said worms being intermeshed, a feeding opening at one end of said chamber, a perforated plate across the opposite end of said chamber, a knife driven by each of said worms adapted to sweep over the inner face of said plate, means for rotating said worms and said knives, and means for holding said plate against said knives while allowing said plate to rock to equalize the pressure on said knives.

3. In a device of the class described, in combination, a chamber having two parallel longitudinally intersecting smooth-walled bores, a feeding worm rotatably journaled in each of said bores, said feeding worms being intermeshed, means on each of said worms for preventing its insertion into the wrong one of the bores of said chamber, a perforated plate located across the discharge end of said chamber, a revoluble knife drivingly connected to each of said worms and adapted to scrape over the face of said perforated plate and means for rotating said worms.

4. In a machine for chopping meat, in combination, a chamber having two parallel longitudinally intersecting bores, one end of said two bores being open, a pair of intermeshed feeding worms located in said chamber and adapted to feed material toward such open end of said bores, a perforated plate removably held across such open end of said bores, clamping means for holding said plate in position, a pair of revoluble knives drivingly connected to said worms and adapted to sweep over the face of said plate, means for adjusting said plate longitudinally of said worms to compensate for wear on said knives and said plate, said means allowing said plate to rock to equalize the pressure of said knives against said plate, and means for rotating said worms.

5. In a machine for comminuting material, in combination, a chamber having two longitudinally intersecting parallel bores, a pair of intermeshed feeding worms journaled in said bores, each of said bores and the associated worm having a corresponding portion of different diameter for preventing the other of said worms from being inserted in the wrong bore, said worms being adapted to feed material toward one end of said chamber, a perforated plate across such end of said chamber, and a rotary knife drivingly connected to each of said worms and rotatable over the face of said plate, each of said knives being adapted to be drivingly connected to only one of said worms.

6. In a machine for comminuting material, in combination, an elongated chamber having two longitudinally intersecting parallel bores, a pair of feeding worms rotatably journaled in said chamber, each of said worms being rotated by one of a pair of meshed gears, a feeding inlet located in said chamber near one end thereof, radial flanges of different diameter near the butt end of said worms receivable in bosses of different diameter in said bores to prevent the placement of said worms in the wrong ones of said bores, said worms being adapted to feed material toward that end of said chamber removed from said inlet, a perforated plate removably clamped over such output end of said chamber, a revoluble knife located adjacent a face of said plate at the end of each worm and means to rotate said meshed gears.

7. In a device for chopping meat, in combination, a chamber, said chamber comprising a pair of longitudinally intersecting parallel bores, a pair of intermeshed feeding worms located in said bores for feeding material toward one end of said chamber, a perforated plate across such end of said chamber at right angles to the axes of said worms, a stub axle nonrotatably secured to said plate coaxially with each of said worms, and a rotary knife journaled on each of said stub axles and drivingly engaged with the aligned one of said worms.

8. In a device of the class described, in combination, a chamber, a pair of intermeshed oppositely rotatable feeding worms journaled in said chamber for feeding material toward an output end of said chamber, a socket in the end of one of said worms, a dissimilar socket in the end of the other of said worms, a pair of rotary knives each having a shank of conformation similar to one of said sockets in a different one of said worms, said shanks fitting said sockets loosely to allow slight rocking on the part of said knives, a perforated plate adjustably held at right angles to the axes of said worms across the output end of said chamber, said plate having two protuberances on its outside face, diametrically opposed and located near its edges, and adjustable compression means engaged with said protuberances for pressing said plate longitudinally of said worms against said knives and for moving said plate longitudinally of said worms to compensate for wear on said knives and said plate.

9. In a device for chopping meat, in combination, a chamber having two longitudinally intersecting bores, each of said bores having a smooth interior, a pair of intermeshed oppositely rotatable feeding worms, one of said worms being journaled in each of said bores, each bore and its associated worm having coacting means to prevent the other of said worms to be journaled in said bore, said worms being adapted to feed material toward an output end of said chamber, a pair of rotary knives, means at the end of each of said worms for driving only one of said knives, a perforated plate adjustable longitudinally of said worms and located across the output end of said chamber, said knives being adapted to sweep over a face of said plate, means for compressing said plate against said knives, and means for synchronously rotating said worms.

10. In a machine for chopping meat, in combination, a casing having a pair of longitudinally extending intersecting smooth-walled bores and a feeding port opening into said bores, a plate fitted across said bores in a position spaced from said feeding port, said plate having a multiplicity of sharp edged perforations, a pair of threaded shafts each rotatably journalled within one of said bores, the threads of said shafts being intermeshed, said threaded shafts and said bores being so related as to constitute a pump capable, when said shafts are rotated in synchronism of forcing meat into engagement with said plate with sufficient hydrostatic pressure to cause nodules of meat pressed against said plate to intrude into said perforations, knives movable over the surface of said plate and cooperating with the sharp edges of said perforations to shear away said nodules, and means for synchronously rotating said threaded shafts and for moving said knives over said plates.

11. In a machine for chopping meat, in combination, a casing having a pair of longitudinally extending intersecting smooth-walled bores and a feeding port opening into said bores, a plate fitted across said bores in a position spaced from said feeding port, said plate having a multiplicity of sharp edged perforations, a pair of threaded shafts each rotatably journalled within one of said bores, the threads of said shafts being intermeshed, said threaded shafts and said bores being so related as to constitute a pump capable, when said shafts are rotated in synchronism, of forcing meat into engagement with said plate with sufficient hydrostatic pressure to cause nodules of the meat pressed against said plate to intrude into said perforations, knives movable across the inner surface of said plate and cooperating with the sharp edges of said perforations to shear away said nodules, and means for synchronously rotating said threaded shafts and for moving said knives across said plates.

12. In a machine for chopping meat, in combination, a casing having a pair of longitudinally extending intersecting smooth-walled bores and a feeding port opening into said bores, a plate fitted across said bores in a position spaced from said feeding port, said plate having a multiplicity of sharp edged perforations, a pair of threaded shafts each rotatably journalled within one of said bores, the threads of said shafts being intermeshed, said threaded shafts and said bores being so related as to constitute a pump capable, when said shafts are rotated in opposite directions and at the same speed, of forcing meat into engagement with said plate with sufficient hydrostatic pressure to cause nodules of the meat pressed against said plate to intrude into said perforations, knives movable over the surface of said plate and cooperating with the sharp edges of said perforations to shear away said nodules, and means for rotating said shafts in opposite directions at the same speed and for moving said knives over said plates.

13. In a machine for comminuting material comprising an elongated chamber having two parallel, intersecting longitudinal bores, a pair of intermeshed feeding worms of opposite hand rotatably journalled in said bores, and means for rotating said worms, inner ends of each of said bores having different diameters and a radial flange on the inner end of each said worms, said radial flanges having diameters corresponding to the diameter of the bores into which said worms are to be inserted.

14. In a machine for comminuting material, in combination, an elongated chamber having two longitudinally intersecting parallel bores, a pair of feeding worms rotatably journalled in said chamber, a pair of spaced radial flanges near the butt of one of said worms, a radial flange of different diameter near the butt of the other of said worms, the last mentioned flange being located between the first mentioned flanges when said worms are inserted in said bores in operative position, whereby relative longitudinal movement of said worms is prevented, said worms being adapted to feed material toward one end of said chamber, a perforated plate removably clamped over such output end of said chamber, a revoluble knife located adjacent a face of said plate and means to rotate said worms and said knife.

15. In a machine for comminuting material, in combination, a chamber comprising a pair of parallel intersecting bores, a pair of intermeshed feeding worms rotatably journalled in said bores, means for rotating said worms, a perforated plate across the output end of said chamber, a knife drivingly engaged with each of said worms and adapted to sweep over a surface of said plate and co-acting means on said worms and on said knives for preventing either of said knives from being engaged with the wrong one of said worms.

16. In a machine for comminuting material, in combination, a chamber having two longitudinally intersecting bores, a worm rotatably journaled in each of said bores, said worms being intermeshed and of opposite hands, a pair of meshed pinions one drivingly connected to each of said worms, means for driving said pinions, a socket in the output end of one of said worms, a dissimilar socket in the end of the other of said worms, a rotatable knife having means drivingly engaged in one of said sockets, a reversely rotatable knife having means drivingly engaged in the other of said sockets, said driving engagement means being dissimilar to fit the respective dissimilar sockets, a perforated plate across the output end of said chamber and adjustable means for clamping said perforated plate against said knives whereby said knives sweep over a surface of said perforated plate.

17. A perforated plate adapted to be removably held at the outlet end of the feeding chamber of a machine for chopping meat, said plate having perforations distributed substantially throughout two overlapping non-concentric annular areas, the remainder of said plate including the centers of said annular areas being free of perforations suitable for cutting meat or journaling shafts.

18. A rotatable knife for a machine for chopping meat adapted to be rotated while pressed against a perforated plate so as to shear off meat pressed into perforations of said plate, said knife comprising a plurality of blades adapted to bear against and sweep over said plate and an integral axial portion extending from the plane of the cutting edges of said blades and terminating in a non-circular, portion adapted to be received in a mating socket in means employed to rotate said knife.

19. In a machine for chopping meat, in combination, a feeding chamber comprising a pair of parallel longitudinally intersecting smooth-walled bores, a pair of intermeshing feeding worms rotatably journaled in said bores, a perforated plate across one end of said chamber, said plate being at right angles to the axes of said feeding worms and at the output end of said worms, a rotatable knife driven by each of said worms and adapted to sweep over the surface of said plate and means for synchronously rotating said worms.

20. A meat chopping machine comprising, in combination, an elongated chamber comprising a pair of parallel intersecting smooth-walled bores, a pair of intermeshed feeding worms, one of said worms being rotatably journaled in each of said bores, a rotatable knife driven by each of said worms, a perforated plate in the output end of said chamber adjacent said knives, means for individually adjustably pressing said knives against the face of said plate and means for rotating said worms.

21. A perforated plate adapted to be removably held at the outlet end of the feeding chamber of a machine for chopping meat, said plate having perforations distributed substantially throughout two overlapping, non-concentric circular areas and having a non-circular perforation at the center of each of the circular areas for receiving and holding a stub axle upon which a knife may be journaled.

CHARLES O. MARSHALL.